(12) United States Patent
Luo

(10) Patent No.: US 7,643,674 B2
(45) Date of Patent: Jan. 5, 2010

(54) CLASSIFICATION METHODS, CLASSIFIER DETERMINATION METHODS, CLASSIFIERS, CLASSIFIER DETERMINATION DEVICES, AND ARTICLES OF MANUFACTURE

(75) Inventor: Huitao Luo, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 763 days.

(21) Appl. No.: 11/129,447

(22) Filed: May 12, 2005

(65) Prior Publication Data

US 2006/0257017 A1 Nov. 16, 2006

(51) Int. Cl.
*G06K 9/62* (2006.01)

(52) U.S. Cl. ..................................... 382/159

(58) Field of Classification Search ................. 382/155, 382/159, 100, 181, 190, 162, 163, 164, 165, 382/166, 167, 115–118; 128/925–930; 600/437–440; 348/239, 606, 207.99, 370, 576; 351/200–204
See application file for complete search history.

(56) References Cited

U.S. PATENT DOCUMENTS

| 7,343,028 B2 * | 3/2008 | Ioffe et al. .................. 382/118 |
| 2004/0066966 A1 * | 4/2004 | Schneiderman ............. 382/159 |
| 2005/0047655 A1 | 3/2005 | Luo |
| 2005/0209519 A1 * | 9/2005 | Krishnan et al. ............ 600/437 |

OTHER PUBLICATIONS

"iSYS—Intelligent System Solutions"; www.isys-solutions.com; May 11, 2005; 1 pp.
"FotoNation"; www.fotonation.com; May 10, 2005; 2 pp.
"Redbot Automatic Red Eye Correction"; www.hpl.hp.com/research/redbot/; May 11, 2005; 1 pp.
"Robust Real-Time Object Detection"; Viola et al.; Second Int'l Workshop on Statistical and Computational Theories; Jul. 13, 2001; pp. 1-25.
"Improved Boosting Algorithms Using Confidence-Rated Predictions"; Schapire et al.; Machine Learning, 37(3); 1999; pp. 297-336.

* cited by examiner

*Primary Examiner*—Samir A. Ahmed
*Assistant Examiner*—Atiba O. Fitzpatrick

(57) ABSTRACT

Classification methods, classifier determination methods, classifiers, classifier determination devices, and articles of manufacture are described. According to one embodiment, a classification method includes accessing an image to be analyzed for the presence of a predefined object, processing the image using a plurality of evaluation stages, generating a plurality of scores for respective ones of the evaluation stages responsive to the processing, wherein the scores are indicative of a likelihood of a candidate region of the image comprising the object, accumulating the scores from the evaluation stages to provide a cumulative score, and using the cumulative score, determining whether the candidate region comprises the object.

42 Claims, 2 Drawing Sheets

US 7,643,674 B2

CLASSIFICATION METHODS, CLASSIFIER DETERMINATION METHODS, CLASSIFIERS, CLASSIFIER DETERMINATION DEVICES, AND ARTICLES OF MANUFACTURE

FIELD OF THE DISCLOSURE

Aspects of the disclosure relate to classification methods, classifier determination methods, classifiers, classifier determination devices, and articles of manufacture.

BACKGROUND

Digital imaging devices, such as digital cameras, are becoming increasingly popular. In addition, traditional film photographs and other hard images may be scanned into digital format for manipulation, archiving or other reasons. Red-eye artifacts may be present in photographs of humans or animals due to light being reflected by blood vessels in the eyes of the subject. This is undesirable and may be unacceptable in certain photographs.

Various methods are utilized to analyze digital data of photographs in an attempt to reduce the effects of red-eye artifacts. Some methods have experienced difficulty with respect to correct identification of red-eye artifacts. In addition, some methods may require relatively significant amounts of processing or computing time of a device processing the images.

At least some aspects of the disclosure provide improved methods and apparatus with respect to identification of objects in images including identification of red-eye defects in digital images.

SUMMARY

According to some aspects, exemplary classification methods, classifier determination methods, classifiers, classifier determination devices, and articles of manufacture are described.

According to one embodiment, a classification method comprises accessing an image to be analyzed for the presence of a predefined object, processing the image using a plurality of evaluation stages, generating a plurality of scores for respective ones of the evaluation stages responsive to the processing, wherein the scores are indicative of a likelihood of a candidate region of the image comprising the object, accumulating the scores from the evaluation stages to provide a cumulative score, and using the cumulative score, determining whether the candidate region comprises the object.

According to another embodiment, a classifier comprises an input configured to access a candidate region of an image in an attempt to determine whether the candidate region comprises a predefined object, a plurality of evaluation stages coupled with the input and individually configured to process the candidate region to generate a respective score indicative of a likelihood that the candidate region comprises the object, and wherein at least one of the evaluation stages is configured to indicate whether the candidate region comprises the object prior to processing of the candidate region by an other of the evaluation stages.

DETAILED DESCRIPTION

Some aspects of the disclosure are directed towards classifier architectures and methods for object detection within digital images. According to at least one embodiment, a classifier includes a cascade of evaluation or processing stages. One or more image features may be evaluated at individual stages to determine scores which indicate a likelihood that a candidate (e.g., candidate region) of an image is a predefined object (e.g., red-eye defect). The score may be accumulated from plural stages in at least one arrangement and a cumulative score may be used to determine if an object is detected or not. At least one embodiment provides early acceptance and rejection of candidate regions corresponding to whether an object is present or not, respectively. At least one of the disclosed embodiments includes an optimization strategy designed to reduce or minimize processing time to analyze images including candidate regions of the images. In one exemplary implementation, the classifier may be utilized to detect red-eye objects in digital images. Details of an exemplary red-eye detection application are described in a U.S. patent application Ser. No. 10/653,019, entitled Detecting and Correcting Redeye in an Image, filed Aug. 29, 2003, naming Huitao Luo et al. as inventors, having U.S. Publication No. 2005-0047655 A1, published on Mar. 3, 2005, and the teachings of which are incorporated herein by reference. Classifiers may be used in other applications in other embodiments. Other aspects are disclosed as is apparent from the following.

Figure 1:
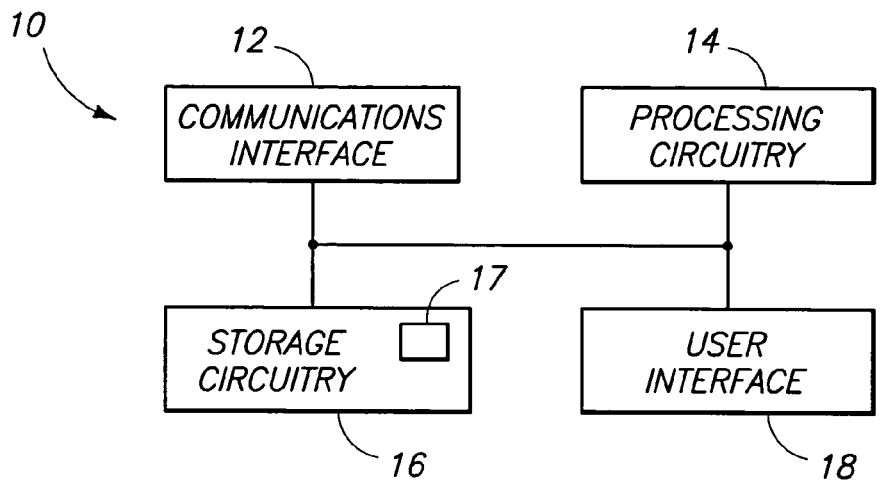
FIG. 1 is a functional block diagram of an exemplary computing device according to one embodiment.

Referring to FIG. 1, an exemplary computing device is illustrated with respect to reference numeral 10. The depicted computing device 10 may be configured as a classifier determination device to train a classifier to detect a predefined object in images and/or optimize (e.g., increase the efficiency) of operations of a classifier according to exemplary embodiments. In another embodiment, the computing device 10 may be configured to implement classifier operations to analyze data of images for identification of images having one or more predefined patterns or objects, such as a red-eye object. For example, for classification, computing device 10 may determine whether one or more candidate region of a subject image of interest corresponds to a predefined object or pattern (e.g., red-eye defect). In exemplary embodiments providing red-eye detection, computing device 10 may be implemented as an imaging device, such as a camera, a device which is configured to receive and process digital images, or any other suitable arrangement. Other embodiments and applications of computing device 10 are possible.

The depicted computing device 10 may be arranged as a personal computer, workstation, or other configuration capable of performing processing operations with respect to classifiers. Computing device 10 includes a communications interface 12, processing circuitry 14, storage circuitry 16, and a user interface 18 in the depicted exemplary configuration. Other configurations are possible including more, less and/or alternative components.

Communications interface 12 is arranged to implement communications of computing device 10 with respect to external devices (not shown). For example, communications interface 12 may be arranged to communicate information bi-directionally with respect to computing device 10. Communications interface 12 may be implemented as a network interface card (NIC), serial or parallel connection, USB port, Firewire interface, flash memory interface, floppy disk drive, or any other suitable arrangement for communicating with respect to computing device 10. Communications interface 12 may comprise an input configured to receive or access electronic files regarding training images, input images to be analyzed, candidate regions of images to be analyzed, and/or other desired information depending upon the implementation of computing device 10.

In exemplary embodiments, processing circuitry 14 is configured to train a classifier, analyze images for the presence of one or more object to execute classifier operations, and/or provide other desired processing according to the implementation and configuration of the respective computing device 10. In addition, processing circuitry 14 may be arranged to process data, control data access and storage, issue commands, and control other desired operations. Processing circuitry may comprise circuitry configured to implement desired programming provided by appropriate media in at least one embodiment. For example, the processing circuitry may be implemented as one or more of a processor and/or other structure configured to execute executable instructions including, for example, software and/or firmware instructions, and/or hardware circuitry. Exemplary embodiments of processing circuitry include hardware logic, PGA, FPGA, ASIC, state machines, and/or other structures alone or in combination with a processor. These examples of processing circuitry 14 are for illustration and other configurations are possible.

Storage circuitry 16 may be configured to buffer and/or store training images, input images, candidate regions, information regarding classification, or other desired data. Storage circuitry 16 is configured to store electronic data and/or programming such as executable instructions (e.g., software and/or firmware), data, or other digital information and may include processor-usable media. Processor-usable media includes any article of manufacture 17 or computer program product which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

User interface 18 is configured to interact with a user including conveying data to a user (e.g., displaying data for observation by the user, audibly communicating data to a user, etc.) as well as receiving inputs from the user (e.g., tactile input voice instruction, etc.). Accordingly, in one exemplary embodiment, the user interface may include a display (e.g., cathode ray tube, LCD, etc.) configured to depict visual information and an audio system as well as a keyboard, mouse and/or other input device. Any other suitable apparatus for interacting with a user may also be utilized.

Figure 2:
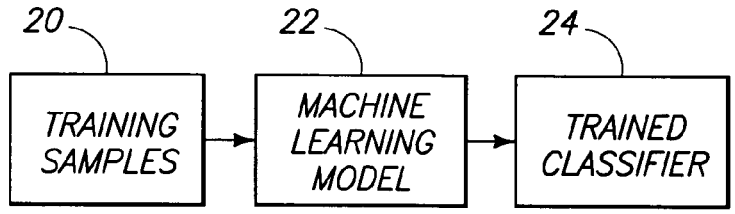
FIG. 2 is an illustrative representation of exemplary processing to train a classifier according to one embodiment.

Referring to FIG. 2, some aspects regarding design of a classifier architecture (e.g., identification of one or more evaluation stages discussed below) are described according to one embodiment. The described exemplary design utilizes machine learning in the depicted embodiment although other embodiments are possible. Computing device 10 may be utilized as a classifier determination device to perform the exemplary design aspects of FIG. 2 in but one embodiment.

Initially, training samples 20 may be utilized to train the classifier. In one embodiment, the samples 20 comprise samples which may or may not include the object to be identified. Individual ones of the samples 20 may be labeled as corresponding to the object or not prior to training. For example, in a red-eye detection implementation, initial candidate detection (e.g., discussed in FIG. 5 of the above-identified patent application) may be performed on a plurality of training images to identify candidates which may correspond to a red-eye defect or object. Thereafter, a user may manually label each candidate as a red-eye object or not to provide the training samples 20 for red-eye detection training. Training samples 20 may be individually represented as a rectangular patch.

According to the described embodiment, a machine learning model 22 may be used to train the classifier. In one embodiment, an improved Adaptive Boosting (AdaBoost) algorithm, described for example in "Improved Boosting Algorithms Using Confidence-Related Predictions", R. Shapire et al., published in Machine Learning, Vol. 37, 1999, pages 297-336, the teachings of which are incorporated by reference herein, may be utilized to train the classifier although other algorithms may be used in other embodiments. As described in one red-eye detection embodiment in the above-incorporated U.S. patent application, a set of image feature functions are defined which may be used by the classifier to analyze candidates to determine whether an object is present. Some of the image feature functions may include area (e.g., in number of pixels), standard deviation, aspect ratio, average intensity, contrast, dynamic range, and/or any other functions which represent aspects of the candidate and which may be used to discriminate objects from non-objects.

According to some embodiments wherein an AdaBoost machine learning model 22 is utilized, an iterative procedure is specified to find the image features for classifier design which provide an increased ability or certainty to discriminate predefined objects from similar candidates which are not the predefined objects (also referred to as the discrimination power of the respective image feature). Initially, the individual training samples 20 may be assigned the same weight. The machine learning model 22 may select from the feature set the feature function having the greatest discrimination power (i.e., providing the least weighted classification error). Additional details regarding an exemplary updating weighting procedure according to one embodiment are described in the paper incorporated by reference above. The selected feature function may be used to generate feature values of the training samples 20 (e.g., computed using the feature function over individual training samples 20). The distribution of the feature values may be used to generate a prior likelihood table which serves as an evaluation function $l=e(v)$ that maps a feature value v to a likelihood score l which may be indicative of the likelihood that the candidate region comprises a predefined object to be classified. When a feature function is selected, the machine learning model 22 may adjust the weight of each training sample 20 and select the feature function having the highest discrimination power and which provides the least weighted classification error. The process may be repeated until a sufficient number of feature functions are selected for the classifier 24. In one embodiment, a training iteration of the machine learning model 22 provides a defined image feature function f_k( ) and likelihood estimation function e_k( ) for individual ones of a plurality of evaluation stages k of the classifier 24 discussed in further detail below with respect to exemplary embodiments of FIGS. 4-5. The appropriate estimation function e_k( ) may compute a likelihood value or score l_k from a feature value v_k (e.g., l_k( )=e_k(v_k)) for the respective evaluation stage k of classifier 24 in one embodiment. Additional details are discussed in the U.S. patent application incorporated by reference above.

As is described in further detail below, at least some of the evaluation stages of classifier 24 may be further configured to perform early acceptance or rejection of a candidate region of an input image corresponding to whether or not the candidate region comprises the predefined pattern or object. In one embodiment, the evaluation stages are arranged to process candidate regions of input images in series as a pipeline. At least some of the evaluation stages may be configured to accept or reject a candidate region without processing of the candidate region by subsequent stages according to one configuration. For example, one or both of a rejecting threshold ($\alpha$_k) and an accepting threshold ($\beta$_k) may be implemented in a respective stage for use in an attempt to respectively reject or accept a candidate region of an input image.

Figure 3:
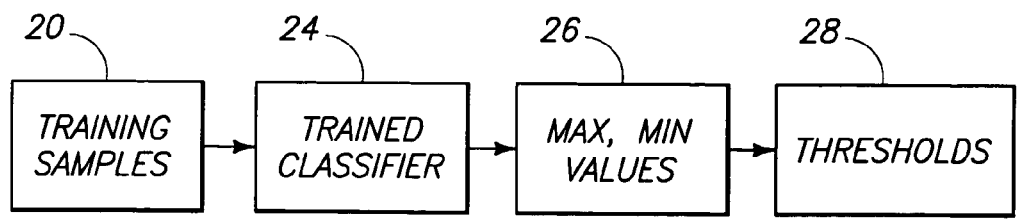
FIG. 3 is an illustrative representation of exemplary processing to determine thresholds of a classifier according to one embodiment.

Referring to FIG. 3, an exemplary training procedure is implemented for determining the rejection and accepting thresholds for the architecture of classifier 24. Computing device 10 configured as a classifier determination device may be utilized to perform the exemplary training aspects of FIG. 3 in but one embodiment.

Training samples 20 which are labeled as objects (e.g., red-eye defect) or not corresponding to objects (e.g., a red region not comprising a red-eye defect) may be utilized to determine the thresholds. The training samples 20 of FIG. 3 may be the same or different from the training samples 20 of FIG. 2. A cumulative likelihood score L_k may be used for a respective evaluation stage k. A plurality of cumulative likelihood scores may include the likelihood scores of the previous stages for the respective training samples 20 for a given stage k. A distribution of likelihoods scores L_k at each stage k may be calculated for positive (i.e., accepted) and negative (i.e., rejected) training samples 20, respectively. Maximal and minimal values 26 for each stage k may be identified as POS_(max), POS_(min), NEG_(max), and NEG_(min). The thresholds 28 may be determined for each stage k by setting the rejecting threshold equal to POS_(min) and the accepting threshold equal to NEG_(max) according to one embodiment. Thresholds 28 may be utilized in the respective stages k of the classifier as discussed in further detail below.

Figure 4:
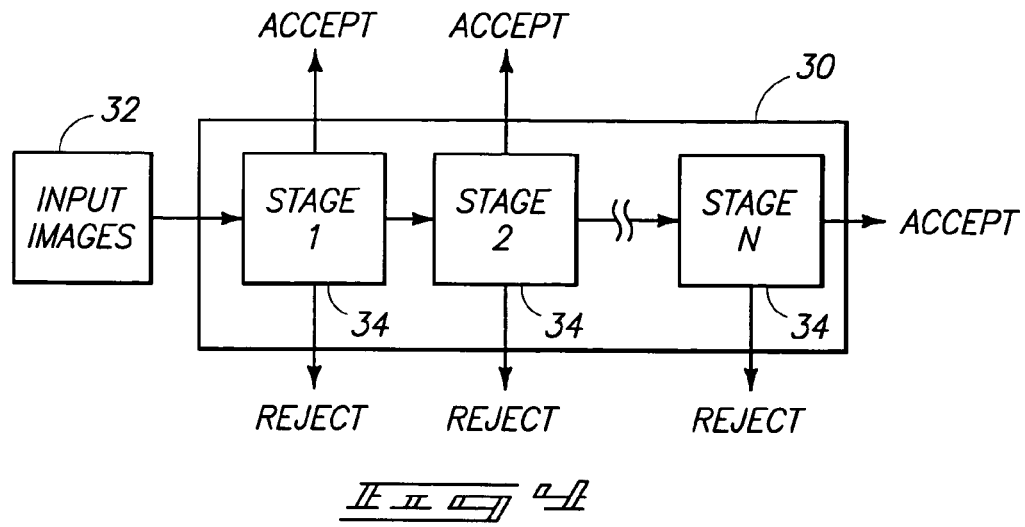
FIG. 4 is an illustrative representation of an exemplary trained classifier according to one embodiment.

Referring to FIG. 4, an exemplary architecture of a classifier 30 using thresholds 28 is shown according to one embodiment. The classifier 30 includes a plurality of stages 34 which are individually described in further detail in FIG. 5. In the depicted embodiment, the stages 34 are arranged in series to process input images 32 as a pipeline. Stages 34 of classifier 30 may correspond to stages of classifier 24 determined in FIG. 2 and additionally include thresholds 28 of FIG. 3 for appropriate stages 34.

During exemplary classification operations of classifier 30, one or more candidate regions of pixels (i.e., one or more candidates which may or may not be objects or patterns of interest) of an input image 32 are analyzed. In one embodiment, each of the candidate regions of an image 32 may be processed by classifier 30 in series one at a time to determine whether the pattern or object is present for the respective one of the candidate regions being analyzed. For a single input image 32, the processing by stages 34 of classifier 30 may be repeated a plurality of times if a plurality of candidate regions are present in the input image 32 in one embodiment. Following processing of one of input images 32, another one of the input images 32 may be processed.

In one embodiment, classifier 30 is configured to implement discrimination operations of candidate regions of images 32 with increased processing efficiency (i.e., reduced processing time). For example, at least some of the stages 34 may be configured (e.g., using thresholds 28) to accept and/or reject a candidate region of an image 32 without processing of the candidate region by subsequent stages 34. Although not shown in FIG. 4, some of the stages 34 may be configured to not perform any evaluations with respect to acceptance or rejection of a candidate region of an image 32 but calculate a likelihood score which may be used by subsequent stages 34 for acceptance or rejection determinations.

In a further embodiment, the arrangement of the stages 34 with respect to one another can be specified in an effort to increase processing efficiency of the classifier 30. For example, in one embodiment, the first stage (i.e., stage 1) 34 to operate upon a candidate region may process the candidate region using the feature function having the greatest discrimination power. Thereafter, the stages 34 may be arranged in series thereafter starting with the next greatest discrimination power continuing to the least. Accordingly, in one embodiment, evaluation stages 34 at the front of the pipeline may have abilities to provide results of increased certainty of whether a candidate region comprises a predefined object compared with evaluation stages 34 subsequently placed in the pipeline. The processing by subsequent stages 34 may be saved if a previous upstream stage 34 accepts or rejects a candidate region. Other arrangements of classifier 30 are possible.

As mentioned above, a likelihood score may be generated by each stage 34 processing a candidate region. If one stage 34 is unable to accept or reject a candidate region (or the respective stage is not configured to accept or reject candidates), the score of the respective stage 34 may be provided for use by subsequent stages 34 of the pipeline for classification. The score relative to an individual candidate from each stage 34 may be accumulated along the pipeline and used by one or more subsequent stage 34 to either accept or reject the candidate as being an object or pattern. More specifically, if a given stage 34 is unable or is not configured to make an acceptance/rejection determination, the cumulative likelihood score may be passed to stages 34 subsequent in the pipeline for processing.

Figure 5:
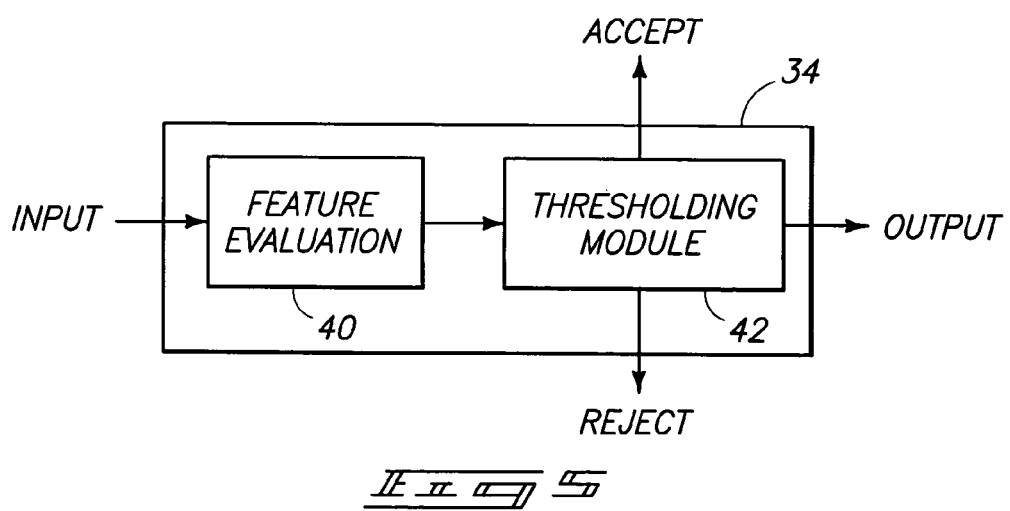
FIG. 5 is an illustrative representation of an exemplary evaluation stage of a trained classifier according to one embodiment.

Referring to FIG. 5, an exemplary configuration is shown for a kth stage 34 of classifier 30. The illustrated stage 34 includes feature evaluation 40 which determines a likelihood score l_k for a candidate region of an input image 32. In addition, the illustrated stage 34 is additionally configured to analyze a candidate region of an input image 32 with respect to acceptance or rejection. In the depicted embodiment of FIG. 5, thresholding module 42 is arranged to implement the acceptance/rejection analysis. For a stage 34 wherein the acceptance/rejection analysis is not performed, thresholding module 42 may be omitted.

Referring again to exemplary operations of feature evaluation 40, the input image 32 may be mapped to a real feature value by v_k=f_k(l) where l refers to the input image candidate region. Feature evaluation 40 may also execute a likelihood estimation function for the respective image feature of the stage 34 which yields the likelihood score l_k according to l_k=e_k(v_k). In one embodiment, the likelihood scores of the current stage 34 and stages 34 previous in the pipeline may be accumulated yielding a cumulative likelihood score after the kth stage as L_k according to L_k=L_(k−1)+l_k.

If present in the respective stage 34, thresholding module 42 receives the cumulative likelihood score L_k outputted by feature evaluation 40 and compares it with the rejecting threshold and accepting threshold. If L_k is less than the rejecting threshold, the input is rejected while if L_k is larger than the accepting threshold, the input is accepted. Otherwise, or if thresholding module 42 is not present, the cumulative likelihood score is provided to the next stage 34.

The thresholds of the final stage 34 of the pipeline may be modified to provide either acceptance or rejection. For example, at the last stage 34, the accepting threshold may be set equal to the rejecting threshold to provide either acceptance or rejection of the input.

As discussed above, according to at least one embodiment of classifier 30, some candidate regions may be accepted or rejected at intermediate stages 34 of the pipeline (e.g., intermediate stages 34 are stages upstream or prior to the last N stage 34 of the pipeline) if the stages 34 are configured to perform acceptance/rejection determinations. Accordingly, computational resources of the computing device 10 executing the classifier 30 may be conserved if processing of candidates by subsequent stages 34 of the pipeline is avoided as mentioned above.

In this sense, the acceptance or rejection by thresholding module 42 of an intermediate stage 34 may be considered to speed up the processing of the input. However, the thresholding modules 42 utilize additional computation. In one embodiment, classifier 30 has increased optimization wherein thresholding modules 42 are only provided for selected ones of the stages 34. In one embodiment, statistics may be used to determine which stages 34 should have associated thresholding modules 42. For example, given stages 34 will have thresholding modules 42 when statistic reduction of the overall computation cost of the classifier 30 is achieved in accordance with one embodiment.

During design of a classifier 30, a binary parameter w_k may be used to control whether a thresholding module 42 is applied to a given stage 34 or not (e.g., thresholding applies if w_k=1). The determination of the w_k parameter for respective stages may be performed by an exemplary computational cost analysis with respect to operations of the computing device 10 executing the classifier 30. The computational cost of feature evaluation 40 and thresholding module 42 of a kth stage may be cf_k and ct_k, respectively. The percentage of data rejected or accepted by an intermediate thresholding module for a kth stage may be pe_k. For a design of a classifier 30 containing N stages, S(k) may denote the statistical computational cost of the last N-k stages (i.e., the remaining statistical cost if an input has survived the first k stages of the pipeline).

When analyzing the kth stage, it may be desirable to minimize S(k−1). In the above-described exemplary embodiment, a given kth stage may have two cases: S(k−1)=S(k)+cf_k if a respective thresholding module 42 is not used; or S'(k−1)=cf_k+ct_k+(1−pe_k)*S(k) if a respective thresholding module 42 is used. The determination to provide the thresholding module 42 for the respective stage 34 may be provided when S(k−1)−S'(k−1)>0 which is also equivalent to pe_k*S(k)>ct_k which may be referred to as equation 1.

During design of classifier 30, initially the control parameters w_k are set to zero (w_k=0, k=1, 2, . . . , N). The percentage pe_k may be estimated by applying classifier 30 over a training or validation data set, which may or may not be the same as training samples 20. When the rejecting and accepting thresholds are known, ct_k is typically a constant. As a first step, equation 1 may be applied to the (N−1)th stage since S(N) is determined when pe_k is known and w_k is set to zero for k=1, 2, . . . , N. Once equation 1 is determined for the (N−1)th stage (i.e., w_(N−1) is determined), S(N−1) becomes available and equation 1 may be further determined for the (N−2)th stage. This process may be repeated until all of the stages 34 are analyzed. The above is one example of increased optimization wherein thresholding modules 42 are provided only for stages 34 where they help reduce the overall computation complexity with respect to the computing device 10 performing the analysis of input. Other analysis may be used to determine whether a thresholding module 42 will be used for a respective stage 34 or not in other embodiments.

Figure 6:
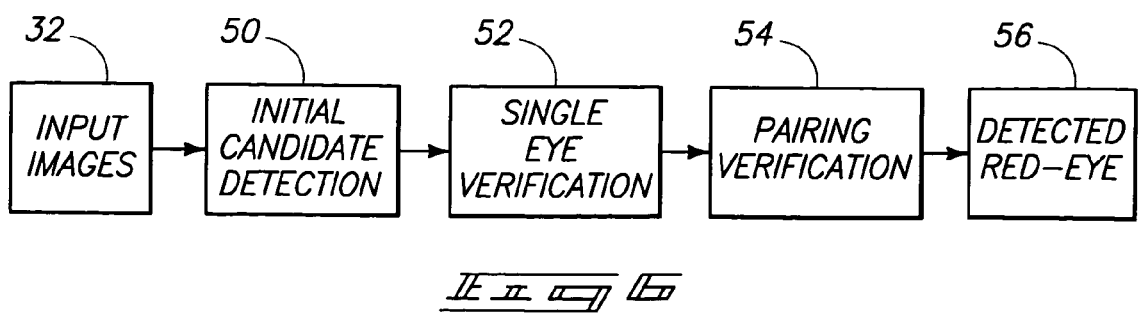
FIG. 6 is an illustrative representation of exemplary processing to detect red-eye defects according to one embodiment.

Referring to FIG. 6, exemplary operational details of the above-described generated classifier used in an automatic red-eye detection application are described according to one embodiment. Other applications of classifiers provided herein are possible.

In the illustrated embodiment, input images 32 such as digital images may be provided as electronic files including digital information regarding images. Exemplary input images 32 include JPG, TIFF, raw data or other formats or compression.

An input image 32 is provided to an appropriate device, such as computing device 10, configured to implement the exemplary processing shown in FIG. 6 including initial candidate detection 50, single eye verification 52, and pairing verification 54 which indicates detected red-eye 56 when appropriate. The illustrated processing may be performed in series as a pipeline. Other embodiments are possible.

Additional details regarding initial candidate detection 50, pairing verification 54 and detected red-eye 56 are described in the above-identified U.S. patent application. Exemplary classifiers 30 described herein may be used to implement the single eye verification 52.

In but one implementation, initial candidate detection 50 may be configured as a fast processing module which attempts to identify all red oval regions as candidate regions which may possibly be red-eye defects. Single eye verification 52 may be implemented using trained classifier 30 in one embodiment and which verifies red-eye candidate regions using various object features and attempts to minimize false alarm candidate regions. Pairing verification 54 performs additional verification operations in one embodiment by grouping candidates into pairs. Once verified, the identified candidate regions of input image 32 may be labeled as detected red-eye 56.

For use in single eye verification 52, a classifier 30 may be designed in three steps including: determining the basic classifier architecture (e.g., number of stages N, the feature functions f_k( ) and likelihood estimation functions e_k( )); determining the rejecting thresholds ($\alpha$_k) and accepting thresholds ($\beta$_k) of the thresholding modules; and determining the w_k parameter for individual ones of the thresholding modules (e.g., determine if the thresholding modules should be applied to respective stages based on computation cost analysis in one embodiment).

Although some classifier aspects are described with respect to red-eye detection, the disclosed methods and apparatus may be used in other object detection and general classification implementations. The disclosed classifier architectures and methods of some embodiments may provide increased accuracy and efficiency for object classification.

Utilization of cumulative data from a plurality of stages of the classifier may enhance the reliability of the results compared with arrangements wherein cumulative data is not used. In addition, performing thresholding analysis for rejection or acceptance at selected ones of the stages may provide increased efficiency compared with other arrangements.

The protection sought is not to be limited to the disclosed embodiments, which are given by way of example only, but instead is to be limited only by the scope of the appended claims.

What is claimed is:

1. A classification method comprising:
    accessing an initial image to be analyzed for the presence of a predefined object;
    processing the initial image using a plurality of evaluation stages;
    generating a plurality of scores for respective ones of the evaluation stages responsive to the processing, wherein the scores are indicative of a likelihood of a candidate region of the initial image comprising the object, wherein the generating includes generating an initial score using an initial one of the evaluation stages;
    using a subsequent one of the evaluation stages, accumulating the scores from the evaluation stages including the initial score to provide a cumulative score;
    using the cumulative score, determining whether the candidate region comprises the object;
    accessing an other image to be analyzed; and
    indicating presence of the object in the other image prior to processing of the other image by at least one of the evaluation stages.

2. The method of claim 1 wherein the evaluation stages are configured to evaluate the candidate region with respect to respective ones of a plurality of image features to generate the respective scores.

3. The method of claim 1 wherein the evaluation stages are configured to determine whether the candidate region comprises the object with different degrees of certainty.

4. The method of claim 3 wherein the processing comprises processing using a first of the evaluation stages before a second of the evaluation stages, and wherein the first evaluation stage is configured to determine whether the candidate region comprises the object with increased certainty compared with the second evaluation stage.

5. The method of claim 1 wherein the determining comprises determining whether the candidate region comprises a red-eye object of the initial image comprising a digital image.

6. A classification method comprising:
    accessing a plurality of candidate regions of at least one image to be analyzed for the presence of a predefined object;
    processing individual ones the candidate regions using a plurality of evaluation stages;
    indicating the candidate regions comprising the object at different ones of the evaluation stages; and
    wherein, for one of the candidate regions, the indicating comprises indicating that the one candidate region comprises the object using a cumulative score accumulated from a plurality of scores for the one candidate region from a plurality of evaluation stages and prior to processing of the one candidate region by at least one of the evaluation stages.

7. The method of claim 6 wherein, for another of the candidate regions, the indicating comprises indicating the another candidate region comprising the object after processing of the another candidate region by all of the evaluation stages.

8. The method of claim 6 wherein the evaluation stages are configured to evaluate the candidate regions with respect to respective ones of a plurality of image features.

9. The method of claim 6 wherein the processing comprises processing using the evaluation stages arranged in series as a pipeline.

10. The method of claim 6 wherein the evaluation stages are individually configured to determine whether the candidate regions comprise the object with different degrees of certainty.

11. The method of claim 10 wherein the processing comprises processing using a first of the evaluation stages before a second of the evaluation stages, and wherein the first evaluation stage is configured to determine whether the candidate regions comprise the object with an increased certainty compared with the second evaluation stage.

12. The method of claim 6 wherein the indicating comprises indicating the candidate regions comprising a red-eye object.

13. A classifier determination method comprising:
    providing a plurality of evaluation stages, wherein the evaluation stages are configured to evaluate a plurality of respective image features with respect to a candidate region of an image to determine a plurality of respective scores individually indicative of the likelihood of the candidate region comprising a predefined object;
    for one of the evaluation stages, first determining to configure the respective one of the evaluation stages to comprise a module configured to analyze a respective one of the scores of the one of the evaluation stages in an attempt to determine whether the candidate region comprises the object;
    for an other of the evaluation stages, second determining to exclude the module; and
    for yet another of the evaluation stages, configuring the yet another evaluation stage to accumulate the scores from the yet another evaluation stage and a previous one of the evaluation stages to provide a cumulative score and to use the cumulative score to indicate that the candidate region comprises the predefined object prior to processing of the candidate region using a subsequent one of the evaluation stages.

14. The method of claim 13 further comprising arranging the evaluation stages in order according to the abilities of the evaluation stages to determine whether the candidate region comprises the object.

15. The method of claim 13 wherein the first and second determinings comprise statistical determinings.

16. The method of claim 13 further comprising providing computational costs of the respective modules indicative of processing by the modules of the one and the other evaluation stages, and wherein the first and second determinings comprise determinings using the respective computational costs.

17. The method of claim 13 wherein the providing the evaluation stages comprises providing the evaluation stages configured to determine the scores indicative of whether the candidate region comprises a red-eye object.

18. A classifier comprising:
    an input configured to access a candidate region of an image in an attempt to determine whether the candidate region comprises a predefined object;
    a plurality of evaluation stages coupled with the input and individually configured to process the candidate region to generate a respective score indicative of a likelihood that the candidate region comprises the object; and
    wherein at least one of the evaluation stages is configured to accumulate the scores from the at least one of the evaluations stages and a previous one of the evaluation stages to provide a cumulative score and to use the cumulative score to indicate that the candidate region comprises the object prior to processing of the candidate region by an other of the evaluation stages.

19. The classifier of claim 18 wherein at least another one of the evaluation stages is not configured to indicate whether the candidate region comprises the object.

20. The classifier of claim 18 wherein the evaluation stages are configured to evaluate the candidate region with respect to respective ones of a plurality of image features.

21. The classifier of claim 18 wherein the evaluation stages are arranged to process the candidate region in series as a pipeline.

22. The classifier of claim 18 wherein the evaluation stages are configured to determine whether the candidate region comprises the object with different degrees of certainty.

23. The classifier of claim 22 wherein a first of the evaluation stages is configured to process the candidate region before a second of the evaluation stages, and wherein the first evaluation stage is configured to determine whether the candidate region comprises the object with increased certainty compared with the second evaluation stage.

24. The classifier of claim 18 wherein the object comprises a red-eye object in the image comprising a digital image.

25. A classifier determination device comprising:
means for accessing a plurality of training images;
means for determining a plurality of evaluation stages for processing subject images of interest;
means for identifying selected ones of the evaluation stages to perform processing to indicate that at least some of the subject images include a predefined object at respective ones of the selected ones of the evaluation stages;
means for individually configuring the selected ones of the evaluation stages comprising less than all of the evaluation stages to perform the processing; and
wherein the means for configuring further comprises means for configuring one of the selected evaluation stages to accumulate scores from the one of the selected evaluation stages and an another of the evaluation stages for one of the subject images to provide a cumulative score and to use the cumulative score to indicate that the one of the subject images includes the predefined object prior to processing of the one of the subject images using a subsequent one of the evaluation stages.

26. The device of claim 25 further comprising means for arranging the evaluation stages for processing the subject images in series as a pipeline.

27. The device of claim 26 wherein the means for arranging comprises means for arranging the evaluation stages in an order according to the abilities of the evaluation stages to determine whether the subject images include the object.

28. The device of claim 25 wherein the means for identifying comprises means for identifying using statistics.

29. The device of claim 25 wherein the means for identifying comprises means for identifying using computational costs associated with respective ones of the evaluation stages.

30. The device of claim 25 wherein the object is a red-eye object.

31. An article of manufacture comprising:
media comprising programming configured to cause processing circuitry to perform processing comprising:
accessing a candidate region of a first image to be analyzed;
using a first evaluation stage, determining a first score indicative of a likelihood that the candidate region of the first image comprises a predefined object;
providing the first score to a second evaluation stage;
using the second evaluation stage, determining a second score indicative of a likelihood that the candidate region of the first image comprises the object using the first score;
indicating whether the candidate region of the first image comprises the object using the second score;
accessing a candidate region of a second image to be analyzed;
using the first evaluation stage, determining a third score indicative of a likelihood that the candidate region of the second image comprises the object; and
indicating that the candidate region of the second image comprises the object using the third score.

32. The article of claim 31 wherein the programming is configured to cause the processing circuitry to provide the first score to the second evaluation stage responsive to the first evaluation stage being unable to determine whether the candidate region comprises the object.

33. The article of claim 31 wherein the programming is configured to cause the processing circuitry to compare the first score with respect to a threshold and to provide the first score to the second evaluation stage responsive to the comparison.

34. The article of claim 31 wherein the programming is configured to cause the processing circuitry to compare the second score with respect to a threshold and to indicate whether the candidate region comprises the object responsive to the comparison.

35. The article of claim 31 wherein the second score comprises a cumulative amount of the first score and a score of the second evaluation stage.

36. The article of claim 31 wherein the object is a red-eye object within the image comprising a digital image.

37. The method of claim 1 wherein the other image is not processed by the at least one of the evaluation stages after the indicating.

38. The method of claim 6 wherein the processing comprises ceasing the processing of the one of the candidate regions by the evaluation stages after determining that the one of the candidate regions comprises the object.

39. The method of claim 13 wherein the module is configured to compare the respective one of the scores of the one of the evaluation stages with a threshold to analyze the respective one of the scores of the one of the evaluation stages.

40. The classifier of claim 18 wherein the candidate region is not processed by the other of the evaluation stages after the candidate region is indicated to comprise the object.

41. The article of claim 31 wherein the second image is not processed by the second evaluation stage after the indicating that the candidate region of the second image comprises the object using the third score.

42. The article of claim 41 wherein the indication that the candidate region of the second image comprises the object using the third score is directly used to correct the object.

* * * * *

UNITED STATES PATENT AND TRADEMARK OFFICE
CERTIFICATE OF CORRECTION

PATENT NO. : 7,643,674 B2  Page 1 of 1
APPLICATION NO. : 11/129447
DATED : January 5, 2010
INVENTOR(S) : Huitao Luo It is certified that error appears in the above-identified patent and that said Letters Patent is hereby corrected as shown below:

In column 9, line 52, in Claim 6, after "ones" insert -- of --.

In column 10, line 35, in Claim 13, delete "vet" and insert -- yet --, therefor.

In column 11, line 1, in Claim 18, delete "evaluations" and insert -- evaluation --, therefor.

Signed and Sealed this

Twenty-ninth Day of June, 2010

David J. Kappos
*Director of the United States Patent and Trademark Office*